Patented May 4, 1948

2,440,750

UNITED STATES PATENT OFFICE 2,440,750

POLYMERIZATION CATALYSTS AND PREPARATION THEREOF

Charles A. Kraus, Providence, R. I., and John D. Calfee, Manhasset, N. Y., assignors to Standard Oil Development Company, a corporation of Delaware No Drawing. Application October 4, 1944, Serial No. 557,218

4 Claims. (Cl. 252—223.3)

This invention relates to catalytic polymerization processes; relates particularly to Friedel-Crafts catalyst complex substances and relates especially to Friedel-Crafts catalyst in the form of composite or complex salts of aluminum chloride with aluminum alkoxides in solution in appropriate solvents, to yield catalyst solutions of relatively high concentration suitable for polymerization and condensation reactions.

In the conducting of polymerization and condensation reactions, difficulty has been experienced in the finding of adequate and satisfactory catalysts which will cause the desired reaction to proceed in the desired way and to yield the desired product. It has been found that for many catalytic reactions for the polymerization and condensation of organic substances, aluminum chloride is a potent and powerful catalyst, but the very low solubility of aluminum chloride in organic solvents generally, sharply limits its usefulness, especially for low temperature reactions to yield solid polymers, since the low solubility of aluminum chloride limits its sphere of activity; and the tendency to form a covering of solid polymer around each grain of solid aluminum chloride, through which the aluminum chloride does not pass, results in many cases in the complete uselessness of the aluminum chloride as a catalyst.

It has been found that aluminum chloride is somewhat soluble in the lower alkyl halides, and very valuable and important reactions have been obtained by the use of such solutions. However, the solubility at saturation in these liquids is so low that for many reactions an insufficient amount of catalyst can be gotten into the site of the reaction, or the amount of solvent necessary to carry the required weight of catalyst is so great as to interfere with the progress of the reaction.

According to the present invention, a catalyst of high solubility characteristics is prepared by combining aluminum with an alcohol to yield the metal alkoxide or alcoholate, which in turn is then combined with a substantial portion of aluminum chloride to yield a complex or alkoxy halide. This complex salt is characterized by a relatively very high solubility in a wide range of solvents, both aliphatic and aromatic; especially in the hydrocarbons and in the halo-substituted hydrocarbons.

The process of the invention provides a new and highly soluble complex or composite Friedel-Crafts type catalyst of high potency and relatively high solubility in a wide range of solvents. Other objects and details of the invention will be apparent from the following description.

In practicing the invention the composite catalyst is prepared by reacting aluminum with an alcohol, under such conditions as to produce an alkoxide or aryl oxide of the aluminum; and the resulting compound is then combined with a similar metal halide to form a complex Friedel-Crafts active metal alkoxy halide catalyst. The resulting substance may be solid or liquid according to the halide chosen and according to the aryl radical chosen. The compound further shows a relatively high solubility in such substances as the lower liquid hydrocarbons, in the alkyl halides, in benzene and its homologues, in carbon disulfide and its homologues, in the aromatic hydrocarbons in general, whether halogenated or not, and in a wide variety of similar oxygen-free liquid solvents.

Example 1

The first step in the process of the invention is the preparation of aluminum alkoxide, in the present example, aluminum ethoxide. For this purpose, aluminum metal in the form of fine shavings was washed with dilute hydrochloric acid, then with dilute sodium hydroxide solution, then thoroughly rinsed with water, then with alcohol, and then with ether; and thereafter dried under vacuum. 100 parts by weight of the clean aluminum (with a minimum of exposure to atmospheric oxygen) was placed in a container along with 650 parts by weight of anhydrous xylene and the container was fitted with dropping vessel and reflux condenser. The xylene was brought to boiling, and to the mixture there was then added 450 parts by weight of absolute alcohol, together with 0.4 part by weight of mercuric chloride. The material was added slowly, dropwise, and care was taken to avoid an excess of alcohol as indicated by the formation of insoluble alcoholates. Sufficient heat was applied to the container to maintain the contents in vigorous ebullition, the vaporized xylene being condensed and returned to the reactor. The alcohol was added over a period of several hours and the boiling under reflux conditions was continued until the reaction ceased. The resulting solution was filtered to remove residual particles of aluminum, the xylene was boiled off, and the ethoxide was distilled under reduced pressure (preferably in all glass equipment). The boiling point varied from about 175° C. to 180° C. at 3 millimeters pressure of mercury. The yield was approximately 70% on the aluminum.

The purified aluminum ethoxy compound Al(OC$_2$H$_5$)$_3$ was then pulverized and mixed with powdered aluminum chloride in a molar ratio of one part of the ethoxide to three parts of the aluminum chloride. The materials were mixed together in a container vented through a calcium chloride tube and cooled by water applied to the exterior of the container to prevent undue heating: and the development of an unduly vigorous reaction. After a relatively short time, about half of the material was converted to a liquid. The container was then connected to a drying train and heated on an oil bath at 150° C., and the mixture stirred until substantially all of the residual solid aluminum chloride had dissolved. Only a brief immersion in the oil bath was required for this step of the operation. As the last of the aluminum chloride dissolved, the evolution of small bubbles of ethylchloride was noted, and the reaction mixture was cooled promptly to minimize the formation of ethyl chloride. The catalyst material as prepared is a dark red, limpid liquid at room temperature which is highly soluble in the halogenated hydrocarbons, CS$_2$, and aromatic hydrocarbons. The material appears to be a composite catalyst having the form of

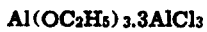

Al(OC$_2$H$_5$)$_3$.3AlCl$_3$

Example 2

50 parts by volume of liquid propylene were diluted with 100 parts by volume of methyl chloride and cooled to −78° C., by vigorous stirring in a container surrounded by a cooling jacket consisting of solid carbon dioxide and isopropyl alcohol. To this cooled mixture there were then added 2 parts by volume of the liquid composite or complex catalyst prepared in Example 1. The reaction mixture stood without perceptible change for approximately 5 minutes, then a rapid polymerization reaction occurred, the heat of reaction being sufficient to cause a vigorous boiling of the reaction mixture. After the reaction had ceased and heat was no longer evolved, the catalyst was destroyed by the addition to the mixture of a small quantity of propyl alcohol. The reaction mixture was then dissolved in petroleum ether to volatilize out the methyl chloride and residual propylene, and the solution in petroleum ether was washed with water. The petroleum ether was then evaporated, leaving a clear, highly viscous oil. This oil was a moderately high molecular weight polymer of propylene, of about 10,000 molecular weight (Staudinger). The polymer is useful as an insulating oil and as a tackifier for synthetic rubber.

Example 3

6 parts by weight of the composite catalyst prepared in Example 1 were mixed with 25 parts by weight of methyl bromide at −23° C. Ethylene and hydrogen chloride in equimolar quantities were then bubbled through the catalyst-methyl bromide mixture. A rapid reaction occurred and introduction of the gases was continued as long as the reaction continued at a good speed. Upon warming the reaction mixture, 55 parts by weight of ethyl chloride were recovered.

Example 4

The catalyst is efficient and effective for the alkylation of benzol. 10 parts by weight of the catalyst of Example 1 were dissolved in 50 parts by weight of benzol at room temperature. Ethyl chloride was bubbled into the solution as rapidly as it dissolved therein. Large quantities of hydrogen chloride were evolved and the heat of reaction was sufficient to cause the benzene to boil. When the hydrogen chloride was no longer evolved the material was washed with water to separate the catalyst and was then fractionally distilled, yielding 8 parts by weight of ethyl benzene, 6 parts by weight of diethyl benzene, and 6 parts by weight of triethyl benzene; a yield of 20% on the original benzene, the balance of which was recovered unchanged.

Example 5

The catalyst is also effective for the alkylation of isobutane, or the combination of ethylene and isobutane. 11 parts by weight of the catalyst of Example 1 were dissolved in 20 parts by weight of methyl bromide and an equal volume of isobutane was added, and the mixture was cooled to −33° C. Ethylene was then bubbled into the solution, maintaining the temperature at −33° C., meanwhile keeping the solution conditions as nearly the same as possible by adding two volumes of isobutane for each volume of ethylene condensed. The solubility of the catalyst gradually decreased and it separated out as a dark red oil during the course of the reaction. As the precipitation of catalyst neared completion, the absorption of ethylene diminished to a negligible amount. The material was separated from the precipitated catalyst, washed and fractionally distilled. Approximately 20% of the material added was obtained as an addition product in the form of 2,3 diethyl butane. The remainder consisted of more highly alkylated compounds and a portion of polymerized ethylene.

Example 6

A mixture was prepared consisting of approximately 80 parts by weight of isobutylene of 98% purity and 20 parts by weight of butadiene of 96% purity. This material was cooled to a temperature between −100° C. and −103° C. by the addition of approximately 3 volumes of liquid ethylene per volume of mixed olefins. To the mixture there was then added a catalyst in the form of a solution of the catalyst as prepared in Example 1 in solution in methyl chloride in 0.7% concentration; the catalyst solution being added in the form of a fine spray onto the surface of the rapidly stirred olefinic mixture. The polymerization proceeded rapidly to yield a solid polymer. The solid polymer was removed from the reaction mixture, brought up to room temperature and washed on the mill to remove as much as possible of the catalyst and the volatile components.

The washed and dried polymer was then compounded according to the following recipe:

| | Parts |
|---|---|
| Polymer | 100 |
| Zinc oxide | 5 |
| Stearic acid | 3 |
| Carbon black | 10 |
| Sulfur | 2 |
| TUADS (tetramethyl thiuram disulfide) | 1 |

Samples of the compounded polymer were then cured for 30 minutes and 60 minutes, and tensile strength and elongation at break were determined to yield the following test inspection record:

| Catalyst | Conv. | Evaluation of Pure Gum Stocks Cured at 307° C. | | | |
|---|---|---|---|---|---|
| | | Tensile Strength | | Elongation | |
| | | 30' | 60' | 30' | 60' |
| Run 1.. 0.7% Al(OC$_2$H$_5$)$_3$.3AlCl$_3$ in MeCl. | Per cent 41 | 2,500 | 3,060 | 1,025 | 1,000 |
| Run 2.. ....do.............. | 40 | 2,740 | 3,060 | 1,150 | 1,050 |

These results show the potency of the catalyst and its efficient operation.

The above examples deal only with aluminum ethoxide in combination with aluminum chloride. The reaction is equally applicable for the formation of a catalyst consisting of aluminum methoxide with aluminum chloride; and the formation of aluminum propoxide and aluminum chloride or other halide. Substantially any of the lower mono hydric alcohols up to about 8, 10 or 12 carbon atoms per molecule may be used, although the methoxide and ethoxide are the preferred components.

Thus, the catalyst of the invention consists of a composite or complex salt of a Friedel-Crafts metal alkoxide with a Friedel-Crafts metal halide which is useful for polymerization and condensation reactions generally by virtue of its solubility in, and mixability with, a relatively large number of solvents and reactive liquid components.

The Friedel-Crafts active metal halides referred to above may be any of those listed in the article by N. O. Calloway entitled "The Friedel-Crafts Synthesis" published in "Chemical Reviews," for the American Chemical Society at Baltimore in 1935, vol. XVII, No. 3, beginning at page 327, the list being particularly well shown in Table 2, page 375 of the article. The Friedel-Crafts metal halides there listed are well known to those skilled in the art, comprising AlCl$_3$, AlBr$_3$, SbCl$_5$, SbCl$_3$, BF$_3$, FeCl$_3$, SnCl$_4$, NaCl·AlCl$_3$, TiCl$_3$, TiCl$_4$, ZrCl$_4$ and ZnCl$_2$.

While there are above disclosed but a limited number of embodiments of the catalyst and process of the invention, it is possible to produce still other embodiments without departing from the inventive concept herein disclosed and it is therefore desired that only such limitations be imposed on the appended claims as are stated therein or required by the prior art.

The invention claimed is:

1. A composition of matter consisting essentially of aluminum alcoholate and aluminum chloride in a 1 to 3 molar ratio, said composition being a double salt complex having a low melting point and a high solubility in alkyl halides, carbon disulfide, and hydrocarbons.

2. A catalyst for polymerizing unsaturated hydrocarbons at temperatures below 0° C. consisting essentially of aluminum alcoholate and a Friedel-Crafts active metal halide in 1 to 3 molecular proportions dissolved in an alkyl halide solvent in a concentration of the order of 0.7%.

3. The chemical process which comprises the steps of reacting together aluminum metal and an alcohol to yield an aluminum alcoholate, and adding to 1 molar part of said alcoholate 3 molar parts of a Friedel-Crafts active metal halide to yield a homogeneous complex characterized by a low melting point and a high solubility in alkyl halide, carbon disulfide, and hydrocarbons.

4. A chemical process as in claim 3 wherein said halide is aluminum chloride.

CHARLES A. KRAUS.
JOHN D. CALFEE.

REFERENCES CITED

The following references are of record in the file of this patent:

UNITED STATES PATENTS

| Number | Name | Date |
|---|---|---|
| 1,459,852 | Mugdan et al. | June 26, 1923 |
| 1,671,517 | Edeleann | May 29, 1928 |
| 1,793,935 | Kaufler et al. | Feb. 24, 1931 |
| 2,144,816 | Schaad | Jan. 24, 1939 |
| 2,276,893 | Thomas et al. | Mar. 17, 1942 |
| 2,300,069 | Skooglund | Oct. 27, 1942 |
| 2,329,858 | Schmering | Sept. 21, 1943 |